United States Patent [19]
Rice

[11] Patent Number: 4,783,891
[45] Date of Patent: Nov. 15, 1988

[54] RELINING PROCESS FOR INTERIOR SURFACE OF A HOLLOW ARTICLE

[76] Inventor: Norman B. Rice, 2062 24th St., Cuyahoga Falls, Ohio 44223

[21] Appl. No.: 69,834

[22] Filed: Jul. 6, 1987

Related U.S. Application Data

[62] Division of Ser. No. 865,757, May 22, 1986.

[51] Int. Cl.[4] .............................................. B23P 17/00
[52] U.S. Cl. .......................................... 156/94; 156/98; 29/421.1
[58] Field of Search ............. 29/421, 455 LM, 522 R; 156/94, 98

[56] References Cited

U.S. PATENT DOCUMENTS

| | | | |
|---|---|---|---|
| 3,356,588 | 12/1967 | Beliaev | 29/421 X |
| 3,439,405 | 4/1969 | Berman et al. | 29/421 X |
| 4,410,391 | 10/1983 | Thomas et al. | 156/94 X |
| 4,622,085 | 11/1986 | Yameda et al. | 156/94 |

*Primary Examiner*—Timothy V. Eley
*Attorney, Agent, or Firm*—Oldham & Oldham Co.

[57] ABSTRACT

Cryogenic process and apparatus for removing adherent coatings or linings from metallic substrates, especially the interiors of metal vessels or pipes. In one embodiment, a metal vessel having a polymeric interior lining is pressurized to about 900 psi, and the lining is contacted with a cryogenic liquid, preferably carbon dioxide, while this pressure is maintainted. The pressure is high enough so that the cryogenic liquid does not boil. The lining is then subjected to shock by ultrasound, for example. This causes the lining to break up into small particles and fall off the metal substrate. These particles, suspended in the cryogenic liquid, are removed from the pressure vessel and separated from the cryogenic liquid, which can be reused. In another embodiment, the cryogenic liquid is injected into a pipe having an adherent mineral deposit while maintaining a pressure of about 700 psi. A stream of cryogenic liquid containing suspended mineral particles is removed from the pipe.

7 Claims, 4 Drawing Sheets

RELINING PROCESS FOR INTERIOR SURFACE OF A HOLLOW ARTICLE

This is a division of application Ser. No. 865,757, filed May 2, 1986.

TECHNICAL FIELD

This invention relates to methods for removing unwanted adherent coatings or linings from metallic articles. More particularly, this invention relates to cryogenic processes for removing such coatings or linings.

BACKGROUND ART

Nearly all railroad tank cars are covered hopper cars, nearly all tanks on trucks, and many storage containers, are lined or coated on the inner surface. These protective linings are made of either latex or rubber (including synthetic rubber). Protective linings made of latex mixtures are used in tank cars and storage containers primarily in the food processing industry or with non-caustic, non-volatile, non-corrosive applications. Protective linings made of rubber are used in tanks cars and storage containers for transportation or storage of chemicals, caustic materials, corrosive materials, abrasives, acids, petroleum and other volatile substances. During heavy use all linings lose their protective qualities and high resistance to the substance being transported or stored, and eventually must be replaced. The useful life of each lining varies, but eventually all such linings must be replaced, the frequency depending on the nature of the lining and the severity of service. Should a vessel with a protective lining be kept in service beyond the useful life of the lining, the substance being transported or stored will invade the area between the lining and the interior (usually steel) of the tank car or storage container, and interfere with the structrual integrity of the tank. If such invasion occurs, costly and often irreparable damage can result.

Current processes for removing unwanted protective linings involve extensive man-hours, energy use and material waste. In addition, some processes require the use of materials, such as finely divided abrasives or solvents, which may present hazards to the workers.

Latex linings are currently removed as follows: First, the inside of the lined vessel is washed to remove any traces of the material which was stored or transported in the vessel. Then, the lining is removed by sand blasting until "white metal" (bare metal) shows. This requires at least two men to be inside the vessel, using high pressure air hoses and wearing protective clothing. masks and breathing filters. The vessel interior is then swept clean of sand, steel shot and latex fragments. Finally, the vessel interior is cleaned, e.g. by sweeping or vacuuming, to remove any debris. After cleaning and inspection, the vessel is ready for relining.

To reline the vessel, the clean metal surface is primed, the primer coat is allowed to cure, and then the new latex lining is applied, as for example by spraying.

A representative process for removing a rubber lining is as follows: After the interior of the vessel has been washed, it is heated to about 600° C., causing the rubber to char. The charred rubber lining is then scraped away with hand tools by men inside the vessel. Any lining which remains fixed to the walls of the tank is removed by means of blow torches. The interior of the vessel is then again washed to remove debris. Immediately after washing, the interior walls of the vessel are dried, with propane gas dryers, for example, to remove any remaining moisture and thereby prevent oxidation. The dry interior wall of the vessel may be sand blasted if required. After sand blasting is completed, the vessel interior is again swept free of debris and inspected.

A new lining is applied to the clean metal surface by means similar to those described above for applying latex linings. That is, the metal surface is first primed, and then a rubber lining is applied by known means.

Cryogenic processes for removing adherent coatings or linings from metal substrates are also known. As far as applicant is aware, none of these is in commercial use.

U.S. Pat. No. 4,409,034 describes a cryogenic process for removing a contaminant material from the surface of a metallic substrate (which may be the interior of a vessel such as a railroad or truck tank car), which comprises spraying a cryogenic liquid, either carbon dioxide or nitrogen, against the surface of the contaminant, vibrating the surface to loosen and remove the contaminant material, and then removing the contaminant material, e.g. by a conveyor, shovel or hydraulic scoop. Cryogenic temperatures in the range of about −100° to about −120° C. are required for injection of the cryogenic liquid into the contaminant substance.

U.S. Pat. No. 4,409,034 does not suggest any good way for removing contaminant material debris once it has been separated from the metal surface. Instead, the debris is simply collected in a pile and removed by a conveyor, for example. The method of this patent requires the presence of both workmen and mechanical devices at the location where such debris collects, which would be inside the tank car or vessel when the cleaning method is applied thereto.

U.S. Pat. No. 4,020,992 describes another cryogenic process for stripping plastic from metal. According to the process described therein, a scrap material, such as a plastic lined metal bottle closure, is treated with liquid nitrogen at about −150° F. to about −200° F. to cause the plastic liner to become brittle. The chilled metal closures and liners are agitated in a hammer mill to break the bond between the closures and the liners. The plastic particles are then separated from metal pieces, (e.g., by a tumble barrel to separate out large metal pieces) followed by an electrical separator.

U.S. Pat. No. 3,527,414 describes a cryogenic process for removing plastic insulation from metal wire. The wire, chopped into short length, is cooled to −20° to −195° C. to embrittle the insulation.

None of the above processes describes the use of pressure, except to keep the cryogenic liquid in the liquid phase, suggestion that actual contact between the cryogenic liquid and the coated substrate is carried out at atmospheric pressure.

Although processes for separating adherent coatings from metallic substrates by use of cryogenic liquids are know, none has overcome one of the major problems which attends the older methods described above, and that is the necessity for manpower inside the vessel to be cleaned.

Quite a different type of metal article having an unwanted adherent coating or lining is a water pipe or main. Mineral deposits gradually build up on the inner walls of water pipes and mains, particularly in hard water areas as is well known. Home and industrial users may use water softeners, which greatly reduce the rate at which such buildup occurs. Municipalities seldom if ever use water softening techniques, because of the large volumes of water which must be treated and the prohibitive costs of such treatment. Instead, mineral deposit or scale gradually builds up and eventually it is so thick that the carrying capacity of the pipe or main is materially reduced. At present there is no practical way to remove this deposit or scale. Instead, it is necessary to replace the pipe or main once the scale has reached such a thickness that water flow is materially impeded.

DISCLOSURE OF INVENTION

An object of this invention is to provide a cryogenic process for removing an adherent coating or lining from a substrate.

A more specific object is to remove a polymeric lining from the interior of a metal vessel by treating the lining with a cryogenic liquid.

Another more specific object is to remove an adherent mineral deposit which lines the inside of a waste pipe by treatment with a cryogenic liquid.

Another object is to remove an adherent coating from a substrate by treatment with a cryogenic liquid while the coating is at a pressure sufficiently high to keep the cryogenic liquid from boiling.

A still further object of this invention is to provide a cryogenic lining removal process in which the particles of lining which are separated from the substrate are removed in suspension in the cryogenic liquid.

These and other objects will be apparent from the specification which follows.

According to this invention, an adherent coating or lining is removed from a substrate by placing the coating under elevated pressure, contacting the coating with a cryogenic liquid at cryogenic temperature while the coating is under said elevated pressure, shocking the coating so that particles of coating separate from the substrate, and withdrawing a stream of the cryogenic liquid containing particles of said coating entrained therein. The elevated pressure is above the vapor pressure of the cryogenic liquid at the cryogenic temperature.

According to another aspect of this invention there is provided a novel apparatus for carrying out a preferred embodiment of the novel process. This apparatus comprises a pressure vessel for receiving a substrate and adherent coating thereon, means for pressuring the pressure vessel, a cryogenic containment vessel for containing a cryogenic liquid under pressure, a transfer line for transferring the cryogenic liquid from the containment vessel to the pressure vessel, a return line for withdrawing cryogenic liquid containing suspended particles of coating from the pressure vessel and for returning cryogenic liquid to the containment vessel, and means in the return line for separating said particles of coating from the cryogenic fluid.

According to another aspect of this invention there is provided a process for relining an interior surface of a hollow article, such as a container/vessel, which comprises applying an adhesive to this interior surface, inserting into the article an inflatable membrane which conforms to the interior surface of the article when inflated, and applying gas pressure to said membrane to inflate same.

BRIEF DESCRIPTION OF DRAWINGS

Figure 1:
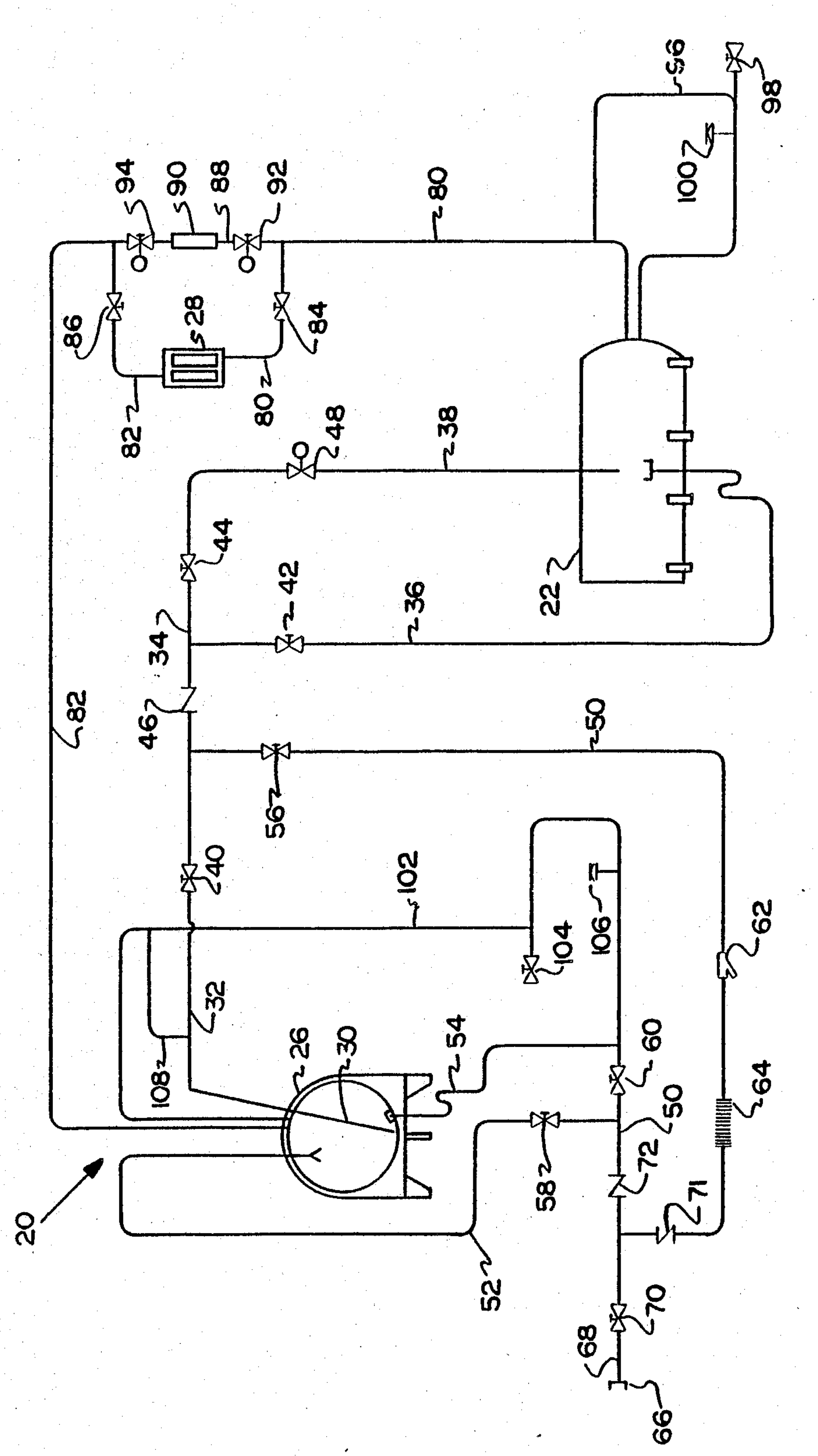

IN THE DRAWINGS:

FIG. 1 is a schematic diagram of the system for carrying out the process according to a first embodiment of this invention.

Figure 2:
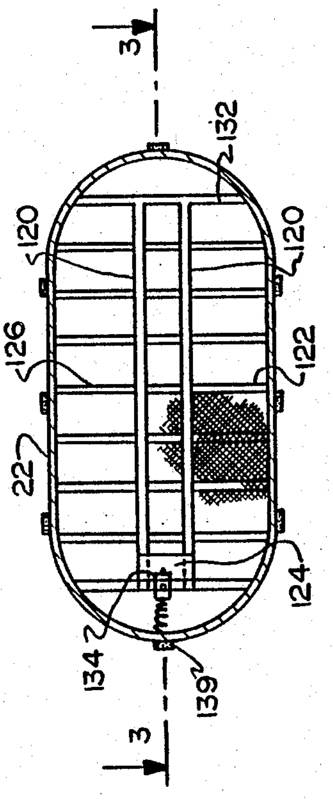
Figure 3:
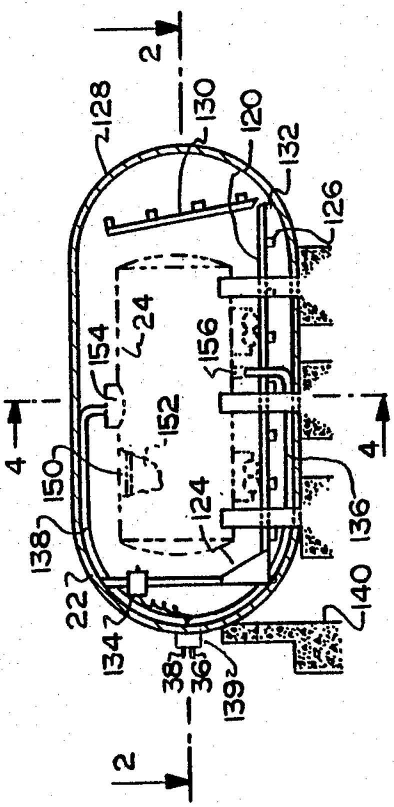

FIG. 2 is a top view of the pressure vessel of the system shown in FIG. 1, with parts broken away and parts shown in section along line 2—2 of FIG. 3.

FIG. 3 is a front elevational view, with parts shown in section along line 3—3 of FIG. 2., of the pressure vessel shown in FIG. 2, with the vessel from which the lining is to be removed shown in phantom lines.

Figure 4:
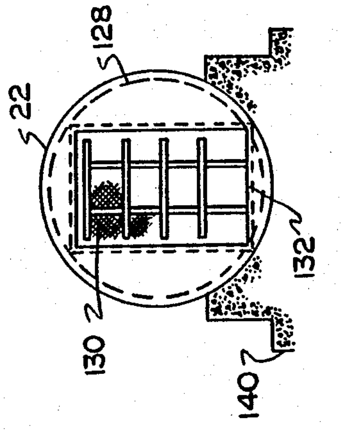

FIG. 4 is an end view of the pressure vessel shown in FIG. 2, with the door removed.

Figure 5:
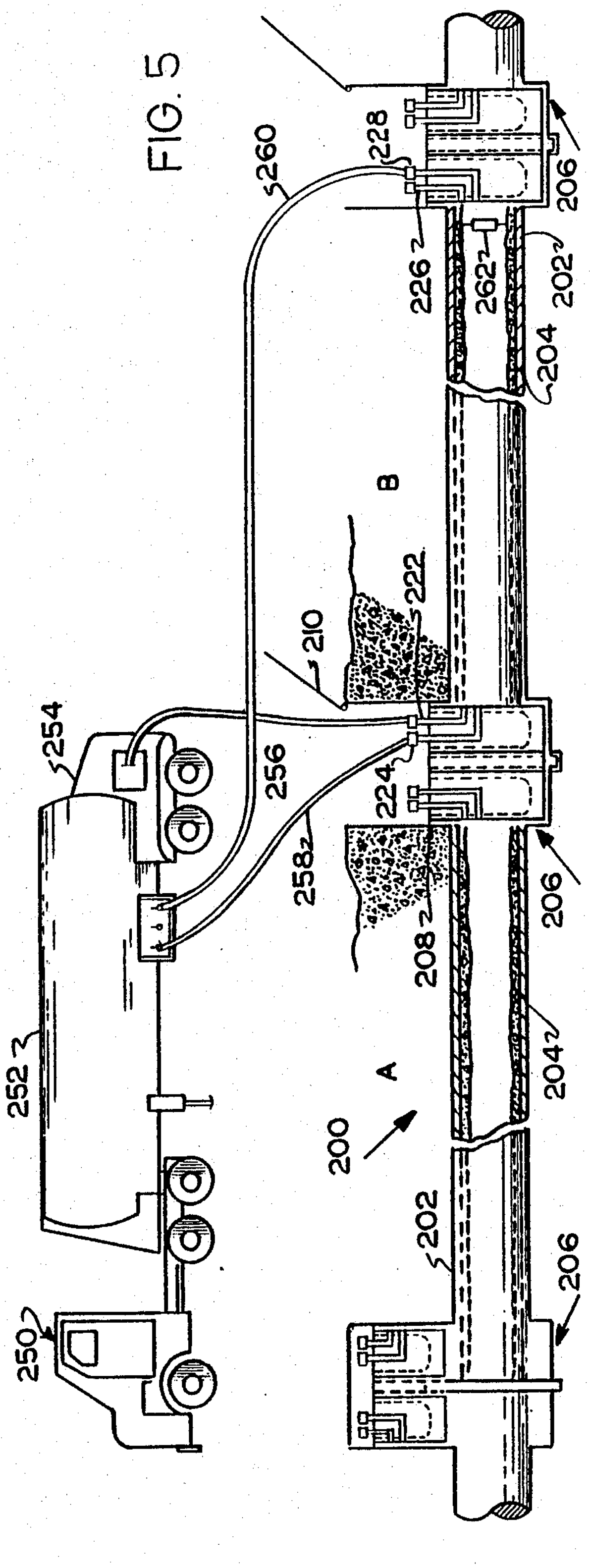

FIG. 5 is a schematic diagram of the system for carrying out the process according to a second embodiment of the invention.

Figure 6:
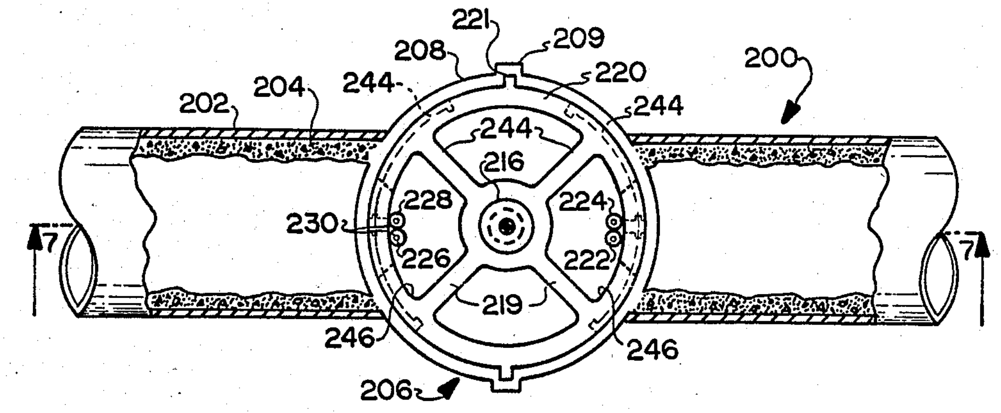

FIG. 6 is a top plan view partly in section of a pipe section and specially designed shutoff valve for the system shown in FIG. 5.

Figure 7:
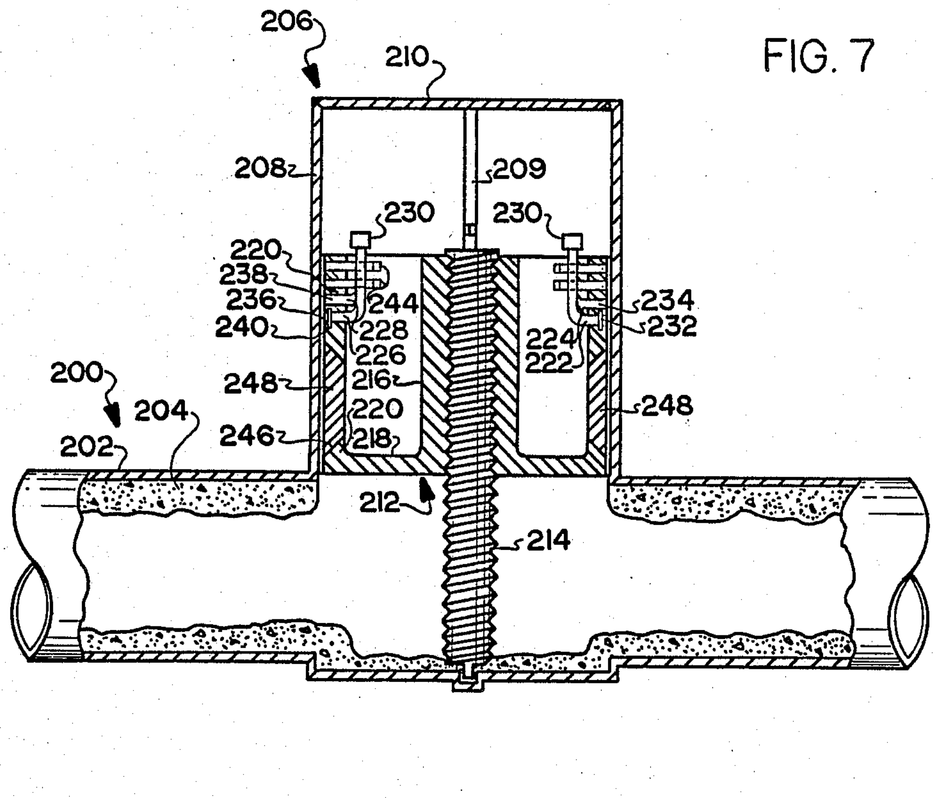

FIG. 7 is a vertical sectional view, taken along line 7—7 of FIG. 6.

Figure 8:
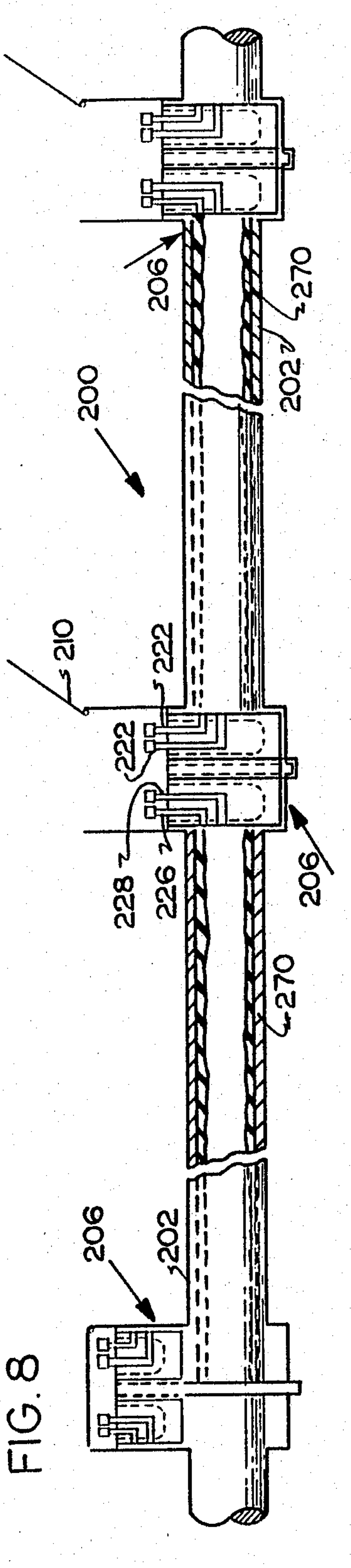

FIG. 8 is a schematic diagram similar to FIG. 5 with a polymeric pipe lining in place.

BEST MODE FOR CARRYING OUT INVENTION

The process of this invention is generally applicable to the removal of an adherent coating or lining which is weakened by cryogenic treatment from a substrate which is capable of withstanding such treatment.

The adherent coating or lining is of a material whose cohesive bonds holding the coating together and adhesive bonds binding the coating to the substrate are appreciably weakened at cryogenic temperatures. The coating material may be either organic or inorganic. Organic coatings are usually polymeric, e.g. rubber (either natural or synthetic) or latex. An inorganic coating may be a mineral deposit, principally calcium carbonate, which forms on the inner walls of a water pipe or main.

The substrate is the object to which the coating adheres. The substrate must be able to withstand the cryogenic temperatures to which it and the coating are subjected without loss of structural integrity. The substrate may be metallic (e.g. steel), clay, ceramic or wood, and is generally inorganic. Usually the substrate is metallic. The substrate in most cases is a hollow article whose interior surface is lined with the adherent coating. This hollow article may be a container or vessel (usually metallic), or a pipe, for example.

The substrate (or, at least, the coated or lined surface of the substrate) and the coating or lining thereon are subjected to a cryogenic temperature at which the cohesive bonds which hold the lining together and the adhesive bonds which bind the lining to the substrate become materially weakened. In the case of a polymeric lining, these bonds become materially weakened at the temperature at which the polymeric material becomes crystalline and brittle, which is about equal to the second order glass transition temperature.

Cryogenic temperatures are achieved by applying a cryogenic liquid, usually either carbon dioxide or nitrogen, to the coating while maintaining the coating at elevated pressure. This elevated pressure will be called the operating pressure. The operating pressure should be sufficiently high to keep the cryogenic liquid from boiling. Use of such pressure makes it possible to recover and reuse the cryogenic liquid, and to provide a fluid stream for removing the debris which is formed by breakup of the adherent coating. After treatment with a cryogenic liquid, the coating is broken up by shock, which may be applied by means of ultrasonic waves. Particles of broken up coating material, entrained in a stream of cryogenic fluid, are then removed from the treatment site.

This invention will now be described with reference to a first embodiment. In this first embodiment, the substrate, or relining objective, is a metallic (preferably steel) container, such as a railroad tank car or hopper car, or a truck tanker, which has an adherent polymeric (e.g. rubber or latex) interior lining which is in need of replacement. Also in this embodiment, the relining objective is placed inside a pressure vessel where it is pressurized, treated with a cryogenic fluid at an elevated pressure sufficient to keep the cryogenic liquid from boiling, and shocked or vibrated to cause the coating to separate in the form of particles from the relining objective. The coating particles, suspended in a stream of the cryogenic liquid, are removed from the pressure vessel and are then separated from the cryogenic liquid.

A preferred system or apparatus for carrying out the process of the first embodiment is shown schematically in FIG. 1. Referring to FIG. 1, the apparatus 20 includes a pressure vessel 22 which is adapted to contain a relining objective 24 (shown in FIG. 3, not shown in FIG. 1). The apparatus 20 also includes a cryogenic containment vessel 26 for containing a cryogenic fluid (typically carbon dioxide or nitrogen, preferably the former) in liquid form under pressure (typically about 925 psia in the case of carbon dioxide). Cryogenic containment vessel 26 may be of conventional structure, including an insulating jacket surrounding the vessel which actually contains the cryogenic fluid. A water cooled air compressor 28 is provided for pressuring either the pressure vessel 22 or cryogenic containment vessel 26 as needed. Air compressor 28 may be of conventional structure, and should be capable of delivering an air stream at ambient temperature (typically about 70° F.) at pressures up to the storage pressure in cryogenic containment vessel 26.

Cryogenic fluid under pressure is transferred from cryogenic containment vessel 26 to pressure vessel 22 by means of a piping system which includes a syphon hose 30 which extends nearly vertically upwardly inside cryogenic containment vessel 26 from its inlet near the bottom of the vessel, a transfer line 32, a two-way line 34, a bottom fill inlet/outlet line 36 which communicates with the bottom (or liquid space) of pressure vessel 22, and a top fill inlet/outlet line 38 which communicates with the top (or gas space) of pressure vessel 22.

Lines 32, 36 and 38 have manually operated shut-off valves 40, 42 and 44, respectively. Two-way line 34 has a two-way or double action filler check valve 46 which will permit fluid flow in either direction but which will rapidly close in the event of a sudden reversal in the direction of flow. A pressure regulator 48 capable of maintaining a predetermined outlet pressure in either direction of flow is provided in line 38.

Cryogenic liquid is returned from pressure vessel 22 to cryogenic containment vessel 26 by a piping system which includes bottom fill and top fill inlet/outlet lines 36 and 38, respectively, two-way line 34, return line 50, top fill line 52 and bottom fill line 54. Top fill line 52 and bottom fill line 54 communicate with the top and bottom, respectively, of cryogenic containment vessel 26. Lines 50, 52 and 54 have manually operated shut-off valves 56, 58 and 60, respectively.

Return line has a strainer 62, followed by a filter 64, for removing coarse particles and fine particles, respectively from the cryogenic liquid stream. As will be described subsequently, the cryogenic liquid stream as it leaves pressure vessel 22 contains suspended particles of lining which are removed from the relining objective 24 during cryogenic treatment. These particles must be removed before the cryogenic liquid returns to containment vessel 26.

A filler hose connection 66 is provided for introducing cryogenic liquid into system 20. Cryogenic liquid is introduced into the system when the system is initially started up and as make-up liquid as required. A line 68 conveys cryogenic liquid from connection 66 to return line 50. Line 68 has a manually operated shut-off valve 70. Check valves 71 and 72 in line 50 prevent back flow of cryogenic fluid from connection line 66 to filter 64, and from containment vessel 36 to connection 66, respectively.

Compressed air lines 80 and 82 connect the compressed air outlet of compressor 28 with pressure vessel 22 and cryogenic containment vessel 26, respectively. Control valves 84 and 86, each of which is a combination pressure regulator and manual shut-off valve, control the flow of air through lines 80 and 82, respectively. A bridge line 88 connects air lines 80 and 82. Bridge line 88 includes an evaporator equalizer 90 and pressure regulators 92, 94 on either side of equalizer 90. Evaporator equalizer 90 is a standard back pressure regulator or diaphragm relief valve which opens when the pressure in system 20 rises above a pre-set value. Equalizer 90 requires an appreciable pressure change, e.g., about 150 psi, to go from tight shut to full open. Pressure regulators 92 and 94 control air flow from cryogenic containment vessel 26 to pressure vessel 22, and vice versa, respectively. A differential pressure gauge to show the pressure difference in lines 80 and 82 has been omitted from the drawings.

Pressure vessel 22 and cryogenic containment vessel 26 are each provided with a pressure gauge and a liquid content gauge, not shown for the sake of clarity. Safety valve and drain valves are likewise not shown. Safety valves which open automatically at pre-set pressures, are provided throughout the system to protect vessels 22 and 26 and high pressure lines.

Each of the vessels 22 and 26 is provided with a vent for gases and with a rupture disconnect which prevents the build-up of excessive pressure. To this end, a line 96 extends from pressure vessel 22 to compressed air line 80 and includes a manual vent valve 98 and a rupture disconnect 100 therein. Similarly, line 102 extends from the top of cryogenic containment vessel 26 to bottom fill line 54, and includes vent valve 104 and rupture disconnect 106. A branch line 108 connects line 102 with transfer line 32. Vent valves 98 and 104 control vent openings for venting gases, e.g. air and vaporized cryogenic fluid, from the system. Rupture disconnects 100 are disks, held by retainers which blow out at a predetermined pressure which is above that at which the safety valves (not shown) are set to open, and well below the rupture points of pressure vessel 22 and cryogenic containing vessel 26. If one or more of the safety valves fails to open, the rupture disconnect 100 and/or 106 will blow open so that excessive pressure does not build up in the system.

Pressure vessel 22 is a specially constructed pressure vessel of size large enough to receive a rail tank car or hopper car, or a truck (semi-trailer) tanker. The structure of pressure vessel 22 will now be described with reference to FIGS. 2 to 4.

Referring now to FIGS. 2 to 4, the pressure vessel 22 has a cylindrical midsection and hemispherical ends. The shape can be varied but must be such that the vessel can withstand high pressures. The interior of pressure vessel 22 has rails 120, forming a track to receive a relining objective 24 such as the rail tank car shown here. Pressure vessel 22 also has a horizontal metal grating 122, the top surface of which is at the same level as the top edge of rails 120. This makes it possible for the pressure vessel to receive either a rail car as shown, or a truck (a tanker truck, for example). A barrier 124 at the end of track 120 prevents collision of the relining objective 24 with the wall of the pressure vessel 22. Cross ties 126 support rails 120 and metal grating 126.

Pressure vessel 22 has a pressure tight door 128 at one end (the right end as shown in FIGS. 2 and 3). This door has a convex and preferably hemispherical shape which corresponds with that of the end of the pressure vessel 22. Just inside door 128 is a hinged section 130 of track and metal grating. Hinged section 130 swings about horizontal hinge 132 between the essentially vertical position shown in FIGS. 2 and 3, in which the hinged section 130 is completely inside pressure vessel 22 to a horizontal position (not shown) in which the hinged section 130 extends outside pressure vessel 22 and joins with a track or pavement on the outside of vessel 22. The center line of hinged section 130 is at the same level as the center lines of ties 126.

Doors may be provided at both ends of pressure vessel 22 if desired to permit quicker turnaround time for removing a lining from and then relining a relining objective. Both doors and both pressure vessel and walls may be of similar construction. When pressure vessel 22 has doors at each end, a relining objective 24 may enter vessel 22 at one end and leave at the other. Relining may be performed after the relining objective has left vessel 22.

An ultrasonic generator 134 is mounted near one end of pressure vessel 22. Ultrasonic generator 134 is mounted along the longitudinal centerline of vessel 22 and may be mounted above barrier 124 as shown. Ultrasonic generator 134 may be a variable standing wave generator. Ultrasonic generator 134 shocks or vibrates the lining of relining objective 24 either during or after cryogenic treatment of the lining, which causes the lining to break up and fall off the interior wall of the relining objective 24. The frequency emitted by the ultrasonic generator 134 should be the same as the resonant frequency of the relining objective 24. Every relining objective which is a container (as is the rail tank car shown here) has a resonant frequency which is dependent on the geometric configuration of the container. An ultrasonic generator 134 having a single frequency can be used where all relining objectives to be treated in a given installation have the same size and shape. (This situation would exist, for example, in the case of a user who owns a fleet of identical rail tank cars or identical tanker trucks). Other devices for producing shock waves or vibrations can be used instead of the ultrasonic generator 134 shown but an ultrasonic generator is preferred.

A pair of flexible hoses 136 and 138, which connect to external lines 36 and 38, respectively, are provided inside pressure vessel 22 for handling cryogenic fluid. These may pass through the wall of vessel 22 at a single location, i.e. at fluid tight joint 139. All utilities, including compressed air lines 80 and 96 (See FIG. 1) and electricity (to power ultrasonic generator 134), should also enter vessel 22 at this one location.

Vessel 22 may be provided with a drain at its bottom. Pressure vessel 22 may be supported by any suitable supporting structure, such as the concrete structure 140 shown herein.

Details of the exterior wall and heat insulating jacket of pressure vessel 22 have been omitted, since suitable pressure vessel constructions having the required pressure resistances and heat insulating properties (to minimize evaporation of cryogenic liquid) are known in the art.

A preferred relining objective 24 is shown diagramatically in FIG. 3, with a portion broken away to show the interior lining. In FIG. 3, relining objective 24 is shown as a rail tank car having a steel outside wall 150 with an adherent polymeric coating or lining 152 on the interior surface of the wall, a top opening 154 for loading and unloading of a liquid cargo, and a bottom drain opening 156. Bottom drain opening 156 is provided with a fitting for attachment of hose 136. The object to be relined, or relining objective, in most cases in a metal container in which the exposed metal interior surfaces (which constitute the substrate) are lined with a protective coating, usually either rubber (natural or synthetic) or latex. Suitable lining materials are well known in the art and therefore will not be described in greater detail. More broadly, the substrate can be any metal object, including a flat metal sheet.

The apparatus 20 shown in FIGS. 1–4 is a fixed installation which is useful whenever relining objectives can be brought to a single site for lining removal and relining and are incapable of withstanding high differential pressures (i.e. differences between pressure inside and pressure outside the relining objective) such as the pressures used in the process of this invention. A relining objective which can withstand such differential pressures can serve as its own pressure vessel.

The preferred process for removing the lining from a vessel or other lined metal object (i.e. the relining objective) will now be described with reference to FIG. 1.

At the start of the operations, cryogenic containment vessel 26 is filled with liquid carbon dioxide at a pressure in excess of the critical pressure and preferably slightly above the operating pressure in pressure vessel 22. For example, when the operating pressure in pressure vessel 22 is 900 psia, the storage pressure in containment vessel 26 may be about 925 psia. The term, "operating pressure" herein is the pressure at which the lining is contacted with a cryogenic liquid in order to weaken the lining. Pressure vessel 22 at the start of operations is empty and is at atmospheric pressure and ambient temperature (typically about 70° F. although of course this will vary at different times of the year).

The process steps are as follows:

First, the relining objective 24 is placed inside pressure vessel 22 and pressure vessel 22 is closed. The temperature inside pressure vessel is ambient (e.g. about 70° F.) (This temperature will vary with the weather.) The free end of hose 138 is placed through opening 154 into the top of relining objective 24, and base 136 is connected to the fitting associated with bottom drain opening 156.

Second, pressure vessel 22 is pressured with air from air compressor 28 to the desired operating pressure. The temperature of the compressed air stream is typically ambient or about 70° F., whichever is lower, so that little temperature change occurs inside vessel 22 during this step. The operating pressure is at least about 150 psia and is preferably about 900 psia. The minimum operating pressure is above the vapor pressure of liquid carbon dioxide at the desired temperature for cryogenic treatment (usually about −80° F. to −40° F. Carbon dioxide at −40° F. has a vapor pressure of not quite 10 atmospheres, or i.e. slightly less than 150 psia.) The preferred operating pressure is just slightly higher than the vapor pressure of liquid carbon dioxide at ambient temperature. (The vapor pressure of carbon dioxide at 70° F. is about 849 psia, and at 75° F. is 905 psia).

Third, the cryogenic liquid, preferably carbon dioxide, is passed from cryogenic containment vessel 26 to pressure vessel 22 where it contacts the relining objective 24, causing the lining to become brittle. The cryogenic liquid is introduced simultaneously into the top and bottom portions of the relining objective 24 through flexible hoses 136 and 138 respectively. Simultaneous top and bottom filling of relining objective 24 is preferable to either top filling or bottom filling alone. Top filling alone causes a decrease in pressure inside the relining objective due to cooling and partial condensation of gases therein, while bottom filling alone causes an increase in pressure inside the relining objective due to decrease in vapor space volume as the cryogenic liquid level rises. Simultaneous top and bottom filling makes it possible to maintain a steady pressure and to utilize compressor 90 most efficiently. The pressure on both the inside and the outside of the relining objective (which is the operating pressure) is still the same as in the preceding step, i.e. at least about 150 psia and preferably about 900 psia. The cryogenic liquid cools the interior of relining objective 24 to a cryogenic temperature of about −80° F. to −40° F., typically about −70° F. The cryogenic temperature must be below the temperature at which the lining becomes brittle. Only a small quantity of liquid carbon dioxide boils in pressure vessel 22 when the operating pressure therein is above about 150 psia, and the quantity which boils is even smaller when an operating pressure of about 900 psia is maintained. The temperature at which the lining material becomes brittle varies with the composition of the lining material. Some cryogenic liquid evaporates. Most of the cryogenic liquid remains in the liquid phase, however, due to the high operating pressure used.

The space inside pressure vessel 22 but outside relining objective 24 is cooled somewhat by cryogenic liquid, but the temperature in this space is above that inside the relining objective. This space serves as an insulator for the relining objective interior. Also, the higher temperatures in this space protect any elastomeric materials (tires and gaskets, for example) associated with the relining objective from embrittlement.

When the lining 152 becomes brittle, both the cohesive forces which hold the lining together and the adhesive forces which bind the lining to its substrate are substantially weakened, and the lining can be shattered by a blow. This property of polymeric materials is well known. The temperature at which the lining becomes brittle is approximately, although not necessarily precisely equal, to the second order glass transition temperature. (A more thorough treatment of the relationship between crystallization temperature, the glass transition temperature, and the temperature at which the material becomes brittle, for various neoprenes, is given in R. M. Murray and J. D. Dettenber, "First and Second Order Transition In Neoprene", *Rubber Chemistry Technology*, Volume 34, pages 668–685 (1961) (presented before the Division of Rubber Chemistry of the American Chemical Society, New York, N.Y., Sept. 14, 1960). It is sometimes necessary to pressure the cryogenic containment vessel 26 by means of compressed air supplied by air compressor 28 during the latter portion of the time in which cryogenic liquid is introduced into pressure vessel 22, in order to sustain the flow from vessel 26 to vessel 22.

To shatter the embrittled protective lining, the relining objective 24 is subjected to ultrasonic vibrations, which are radiated from ultrasonic generator 134 inside pressure vessel 22. Each lining has its resonant frequency, which depends on the shape and the composition of the lining. The resonant frequency of the lining is nearly always different from that of the substrate or relining objective 24. Application of a frequency substantially equal to the resonant frequency of the lining causes the lining to shatter and to slough off in the form of small particles. These particles and cryogenic liquid flow out of the relining objective 24 through drain opening 156, lines 136 and 36. The surface of the relining objective is thus clean and ready for relining.

Other means known in the art can be used to shock the relining objective 24 and the lining thereon, in order to cause the lining to shatter and fall off.

Next, the spent cryogenic fluid carrying suspended particles of lining debris, is transferred from pressure vessel 22 back to cryogenic containment vessel 26. Pressure vessel 22 may be pressurized to about 950 psia so that no pumps are needed. Alternatively, some cryogenic liquid is vented from containment vessel 26 (via vent 104) until the pressure therein is lower than the pressure in vessel 22 (about 850 psia, for example). Debris is removed by passing the spent cryogenic fluid stream through a strainer 62 (for coarse particles), a filter 64 (for finer particles), or preferably both. After removal of debris, the clean cryogenic fluid can be returned to the cryogenic containment vessel 26 via either top fill line 52 or bottom fill line 54, or both. Simultaneous top and bottom filling is preferred for the reasons already discussed in connection with filling pressure vessel 22.

Finally, the pressure in pressure vessel 22, and if desired throughout the entire system 20 except cryogenic containment vessel 26, is dropped to atmospheric pressure. This is done by opening vent valve 98 while valves which prevent simultaneous venting of containment vessel 26 (valves 40, 58, 60, 70, 86, and 94, for example) are closed. The clean interior surface of the relining objective 24 is now ready for relining.

The interior of relining objective 24 may be relined according to the invention with a pre-fabricated polymeric lining (usually rubber or other elastomer) having the size and shape of the relining objective interior. This lining, which is in the form of an inflatable membrane or bladder, is inserted in its collapsed (i.e. non-inflated) state into the relining objective 24. The membrane is inflated by compressed air supplied by compressor 28. Comparatively low pressure, e.g., about 20 to 60 psig will suffice. An adhesive is applied at several points on the interior surface of the relining objective prior to insertion of the lining, to assure good adhesion of the lining to the relining objective.

Alternatively, the relining objective 24 may be relined by methods and with materials which are known in the art.

A substantially higher operating pressure is required when nitrogen is used instead of carbon dioxide as the cryogenic liquid, because nitrogen has a much higher vapor pressure than carbon dioxide at any given temperature.

The shape of the article or reclining objective is not material to the above process. While the relining objective is usually a container, it may be an article which is not enclosed, including a flat sheet.

When the relining objective is a container which is capable of withstanding differential pressures exceeding the operating pressures of the present process, the relining objective can serve as its own pressure vessel. Otherwise the process remains the same.

The operating pressure in the above process may be as low as about 150 psia, which of course, is well below the vapor pressure of the cryogenic liquid at ambient temperature. Some cryogenic liquid boils in this case when cryogenic liquid is first admitted to pressure vessel 22. However, the amount of cryogenic liquid which boils is small because the interior of vessel 22 is quickly cooled to a temperature below the boiling point of the cryogenic liquid at the operating pressure.

The process according to a second embodiment of the invention and system therefore will now be described with reference to FIGS. 5-8.

According to this embodiment, a primarily mineral deposit is removed from the inner wall of a water pipe. The mineral deposit is the adherent coating or lining and the pipe is the substrate.

Referring now to FIG. 5, 200 denotes generally a system according to the second embodiment of this invention. This system includes a water pipe 202 having an adherent primarily mineral deposit 204 on the inner wall thereof. Such deposits form on the inner walls of water pipes and mains over a period of time, especially in hard water areas, as is well known. They may reduce the capacity of the pipe considerably, and are difficult to remove, as is also well known. The mineral deposit may contain some organic matter, but is primarily mineral in nature.

Water pipe 202 may be either a metal (e.g. steel or lead), clay, ceramic or wood pipe. Application of the present process to plastic pipes, such as polyvinyl chloride (PVC) pipes, is not recommended, because the cryogenic liquid may embrittle the pipe.

Water pipe 202 in most cases is buried beneath the surface of the ground at such depth that freezing is unlikely to occur, as shown in FIG. 5. A depth of about 3 feet is typical in northern United States. The ambient temperature at this depth seldom goes below 32° F. (0° C.) or above about 58° F. (14° C.).

Water pipe 202 has a plurality of fluid tight valves 206 at spaced intervals along the length of the pipe. In FIG. 5, three such valves are shown for purposes of illustration. This establishes pipe sections A and B, each of which can be treated independently of the other and any other pipe section in order to remove mineral deposit in accordance with this invention. Valves 206 must be air tight and capable of withstanding a differential pressure of at least about 700 psi, preferably somewhat higher. The preferred valves 206 are of special design to be explained with reference to FIG. 6 and 7. In addition to providing airtight and watertight closures, the preferred valves 206 provide for delivery and removal of compressed air and cryogenic liquid streams. Valves which are already part of a municipal water main network may be retained provided they are airtight and watertight and capable of withstanding at least 700 psi. Of course, if the conventional water main valves are retained, it will be necessary to provide some means for delivering and removing compressed air and cryogenic liquid; for example, it may be necessary to drill holes in water pipe 202 near the valves for this purpose.

Referring now to FIGS. 6 and 7, each valve 206 comprises a vertical cylindrical housing 208 which extends upwardly from pipe 202. Housing 208 has a pair of vertical splines 209 for guiding a reciprocable closure member, and a hinged cover 210 at the top for keeping dirt out. Each valve 206 also includes a vertically reciprocable closure member 212 in the form of a piston, and a vertical screw 214 for raising and lowering closure member 212.

Closure member 212 comprises an internally screw threaded hub 216 which surrounds and engages screw 214, a circular head 218 at the bottom of closure member 212, a plurality of vertical partitions 219 (four such partitions at 90 degree intervals are shown), and a vertical cylindrical sleeve or skirt 220 which extends upwardly from head 218 and forms the side walls of the closure member 212. Partitions 219 extend from hub 216 to side wall 220. Closure member 212 also has a pair of splines 221 which engage splines 209 of housing 208 to prevent rotation of the closure member.

Manifolds 222, 224, 226 and 228 provide for the supply of compressed air, the supply of cryogenic fluid, venting of compressed air, and the return of cryogenic fluid, respectively. Each of these manifolds has a horizontal portion which is joined at one end to side wall 220, and a vertical portion extending upwardly from the horizontal portion. Quick release attachments 230 are provided at the upper ends of the manifolds. These quick release attachments 230 permit attachment of a hose as will be described. These quick release attachments 230 are closure members which have open and closed portions to permit or prevent passage of fluid between the manifold and the attached hose (or the atmosphere where no hose is attached).

Side wall 220 has ports or openings 232, 234, 236 and 238, which communicate with manifolds 222, 224, 226 and 228, respectively. Recesses 240 for C-clips (not shown) surround the air space ports 232 and 236. The C-clips are provided for attachment of one end of an inflatable elastomeric lining, as will be described.

Side wall 220 and housing 208 are in air-tight engagement. Two seals, such as the partial ring seals 244, are provided on the outside surface of side wall 220 to assure airtight engagement. The preferred partial ring seals 244 shown each extend approximately 90 degrees as best seen in FIG. 6. Other types of seals, as for example conventional elastomeric O-ring seals, may be used instead.

A pair of diametrically opposite access ports 246 are provided in side wall 220. These access ports 246 are aligned with pipe 202 when the valve closure member 212 is in its closed or lowered position. These access ports are provided to permit access to the pipe sections A and B particularly for the purpose of inserting an ultrasonic generator and an inflatable elastomeric lining as will be described. Ports 246 are closed by means of fluid tight covers 248. The edges of covers 248 and the complimentary seating surfaces in side wall 220, which define ports 246, are beveled as shown to assure a fluid tight closure. The seating force of covers 248 against their respective port side walls will increase as fluid pressure on the covers 248 increases.

Referring back to FIG. 5, a tanker truck 250 having a tank 252 for cryogenic liquid, and an onboard air compressor 254 may be used to deliver compressed air and cryogenic liquid to a pipe section to be serviced. Assume that pipe section B in FIG. 5 is to be treated to remove at least a portion of the adherent coating or scale 204 of inorganic material. High pressure lines may be connected in the manner shown in FIG. 5 in which compressed air line 256 extends from air compressor 254 to air manifold 222 of the center valve 206, cryogenic fluid supply line 258 extends from tank 252 to the cryogenic supply manifold 224 of center valve 206, and cryogenic fluid return line 260 extends from cryogenic return manifold 228 of the right hand valve 206 back to tank 252. No hose connection is required for air vent manifold 226 of the right hand valve 206.

An ultrasonic generator 262 may be placed inside the section B of pipe 202 which is to be treated. This ultrasonic generator may be put in place and removed by a suitable means, such as a flexible cable generally similar to the flexible cables used for removing tree roots from water mains.

A preferred process for removing a mineral deposit 204 from a section B of a pipe 202 in accordance with the second embodiment of this invention will now be described.

First of all, ultrasonic generator 262 is inserted into section B of pipe 202. This may be done by lowering closure member 212 of center valve 206 with the right hand cover 248 removed, and passing a flexible cable with the ultrasonic generator 262 attached thereto through the open access port 246 and through such length of pipe section B as is desired. The flexible cable is then withdrawn, leaving the ultrasonic generator in place, and valve closure member 212 is raised and the cover 248 replaced.

Second, center valve 206 is closed, right hand valve 206 remains open, and a slight air pressure is applied via compressed air line 256 and manifold 222 to drive out any moisture which remains in pipe section B. The right hand valve 206 is then closed, isolating section B from the pipe sections on either side, and the process of this invention can then be begun.

The process steps according to this invention are as follows:

First, the inside of pipe section B, and the mineral deposit 204 which adheres to the inside of pipe 202, are pressured with air from air compressor 254 to an operating pressure of at least about 150 psia and preferably about 700 psia or slightly higher. An air pressure of 150 psia is sufficient to prevent liquid carbon dioxide from boiling at −40° F. (the maximum cryogenic temperature for the present process), and a pressure of 700 psia is high enough to keep liquid carbon dioxide from boiling at a temperature of 58° F., which is approximately the ambient temperature of a pipe which is buried three feet deep. As in the first embodiment, it is important to carry out the process at a pressure high enough so that liquid carbon dioxide (or other cryogenic liquids) does not boil.

Second, liquid carbon dioxide (or other cryogenic liquid) is introduced in the pipe section B while the aforesaid operating pressure is maintained. Pipe section B is rapidly cooled from ambient temperature (about 58° F.) to a cryogenic temperature of about −80° F. to about −40° F. A small amount of carbon dioxide vaporizes.

Exposure of the mineral deposit 204 to a cryogenic temperature materially weakens both the cohesive forces which hold the mineral deposit 204 together and the adhesive forces which cause the deposit 204 to adhere to the pipe 202, so that shock or impact will cause a substantial portion of the mineral deposit 204 to break off.

Third, the mineral deposit 204 is shocked by means of ultrasonic generator 262 or other shock-producing device. Other types of devices may be used for imparting mechanical vibration or shock to the mineral deposit, but an ultrasonic generator is preferred. This causes at least part of the mineral deposit 204 to fall off the pipe wall as finely divided particles. Complete removal of mineral deposit 204 from the interior of pipe 202 is not important; it is necessary only to remove enough of deposit 204 to materially improve the water flow rate through pipe 202.

Fourth, a stream of liquid carbon dioxide containing entrained mineral particles from deposit 204 is withdrawn from pipe section B via cryogenic return manifold 228 in right hand valve 206, and is returned to tank 252 via return line 260. The debris particles can be separated from the cryogenic fluid at a site which is remote from the pipe section B being treated.

Finally, the quick release 230 in air vent manifold 226 of right hand valve 206 is opened, venting compressed air and returning the pressure in pipe section B to atmospheric pressure.

After pipe section B has returned to atmospheric pressure, both the center and the right hand valves 206 may be opened to resume water flow.

After the pipe has been cleaned, it is desirable to line the pipe with an inflatable, flexible membrane made of a durable polymeric material, which is preferably a rubber or other elastomeric material. This inflatable lining is tubular, open at both ends, and is of such size that, when inflated, it will abut against the interior surface of pipe 202 or any mineral deposit which remains thereon. The length of the lining is about equal to the length one pipe section, e.g. A or B. An adhesive must first be applied to the interior of pipe 202 so that the flexible membrane will be held in place.

The flexible lining 270 is inserted into pipe section B through the open access ports 246 of successive valves 206 and the ends are secured to air manifolds 222 of center valve 206 and 226 of right hand valve 206 by means of C-clips.

One end of the inflatable lining 270 is pressurized with air pressure delivered from air compressor 254 through line 256 and manifold 222 of center valve 206. This causes the lining to inflate and to expand until it is in contact with the interior of pipe 202 (and any mineral deposit 204 remaining thereon as shown in FIG. 8). Air pressure is then turned off and pipe section B is vented through manifold 226 in the right hand valve 206, returning the pipe section to atmospheric pressure. The ends of the inflatable lining are then detached from the C-clips and the covers 248 replaced. Valves 206 may then be opened (i.e., raised) and pipe section B returned to service.

It is desirable to pressure test the pipe section B by applying a slightly superatmospheric pressure through line 256 and manifold 222 and to fill any cracks with mortar according to conventional procedures before inserting the line 270. However, this is not necessary, since the lining 270 is fluid tight and capable of withstanding pressures far in excess of those encountered in service as water flows through the pipe.

A major advantage of the present process is that the cryogenic liquid serves as a suspending agent for convenient removal of the particles of coating or lining which separate from the substrate. Use of shovels, conveyors, etc., as described for example in U.S. Pat. No. 4,409,034, is not necessary.

Another advantage of the present process is that no pumps are necessary for handling cryogenic liquids. Such pumps are expensive to operate and maintain.

The advantages of the present process over the non-cryogenic processes now in use for removing linings in vessels are even more significant. No workers are required to be inside the vessel being relined, no solvents are used, and no workers are exposed to dust. In addition, there are no problems of cleanup or of removal of lining which sticks to the vessel wall in the process of the invention as there are in processes in present use.

The process of this invention also provides for the first time a practical process for removing deposits or scale from water pipes and mains. Before business and residential users have had no solution other than to use water softeners, which imparts sodium into the water stream and are therefore undesirable for drinking purposes, while municipalities have had no solution whatever other than to face a gradually declining flow rate through pipes and mains, ultimately requiring their replacement.

While in accordance with the patent statutes, preferred embodiments and the best mode have been presented, the scope of the invention is not limited thereto. Various modifications can be made and other embodiments provided without departing from the scope of the invention.

What is claimed is:

1. A process for relining an interior surface of a hollow article which is capable of being pressurized, said process comprising: (a) inserting into said article an inflatable elastomeric lining which conforms to said interior surface when inflated, (b) bonding said lining to said interior surface by means of an adhesive, and (c) applying gas pressure to said lining to inflate the same.

2. A process according to claim 1 in which said article is a metallic article.

3. A process according to claim 1 in which said article is an article for the storage or transportation of solid or liquid material.

4. A process according to claim 3 in which said article is a metallic container.

5. A process according to claim 3 in which said article is a pipe.

6. A process according to claim 5 in which said lining is tubular, said pipe has a plurality of spaced valves defining pipe sections therebetween and each of said valves has means associated therewith for permitting insertion of said lining and retaining one end of said lining in place, and in which one end of said lining is held in place by said means while gas pressure is applied at the other end of said lining to inflate the same.

7. A process according to claim 1 in which said gas is compressed air.

* * * * *